United States Patent [19]

Bockholt

[11] 4,392,053
[45] Jul. 5, 1983

[54] OPTICAL PROBE

[75] Inventor: Karlheinz H. Bockholt, Delavan, Wis.

[73] Assignee: Western Publishing Inc., Racine, Wis.

[21] Appl. No.: 296,037

[22] Filed: Aug. 25, 1981

[51] Int. Cl.³ .................... G06K 13/06; G06K 7/10
[52] U.S. Cl. ................................. 235/472; 235/468; 235/469
[58] Field of Search .................. 235/468, 469, 472

[56] References Cited

U.S. PATENT DOCUMENTS

| | | | |
|---|---|---|---|
| 2,420,716 | 5/1947 | Morton et al. | 250/41.5 |
| 3,238,501 | 3/1966 | Mak et al. | 340/146.6 |
| 3,359,405 | 12/1967 | Sundbland | 235/61.11 |
| 3,731,064 | 5/1973 | Berler et al. | 235/61.11 E |
| 4,210,802 | 7/1980 | Sakai | 235/472 X |

Primary Examiner—Harold I. Pitts
Attorney, Agent, or Firm—Ronald M. Goldman; Max E. Shirk; James G. O'Neill

[57] ABSTRACT

An optical probe comprising an optical emitter and a detector which are directed through a cylindrical lens to be focused into an elongated pattern which is arranged for reading a printed optical code. The emitter and detector are angled relative to the central and vertical axes of the lens to produce an elongated light pattern adapted for reading an elongated bar code. A shutter may enhance the slit effect. A planar base and viewing aperture may also be provided.

9 Claims, 6 Drawing Figures

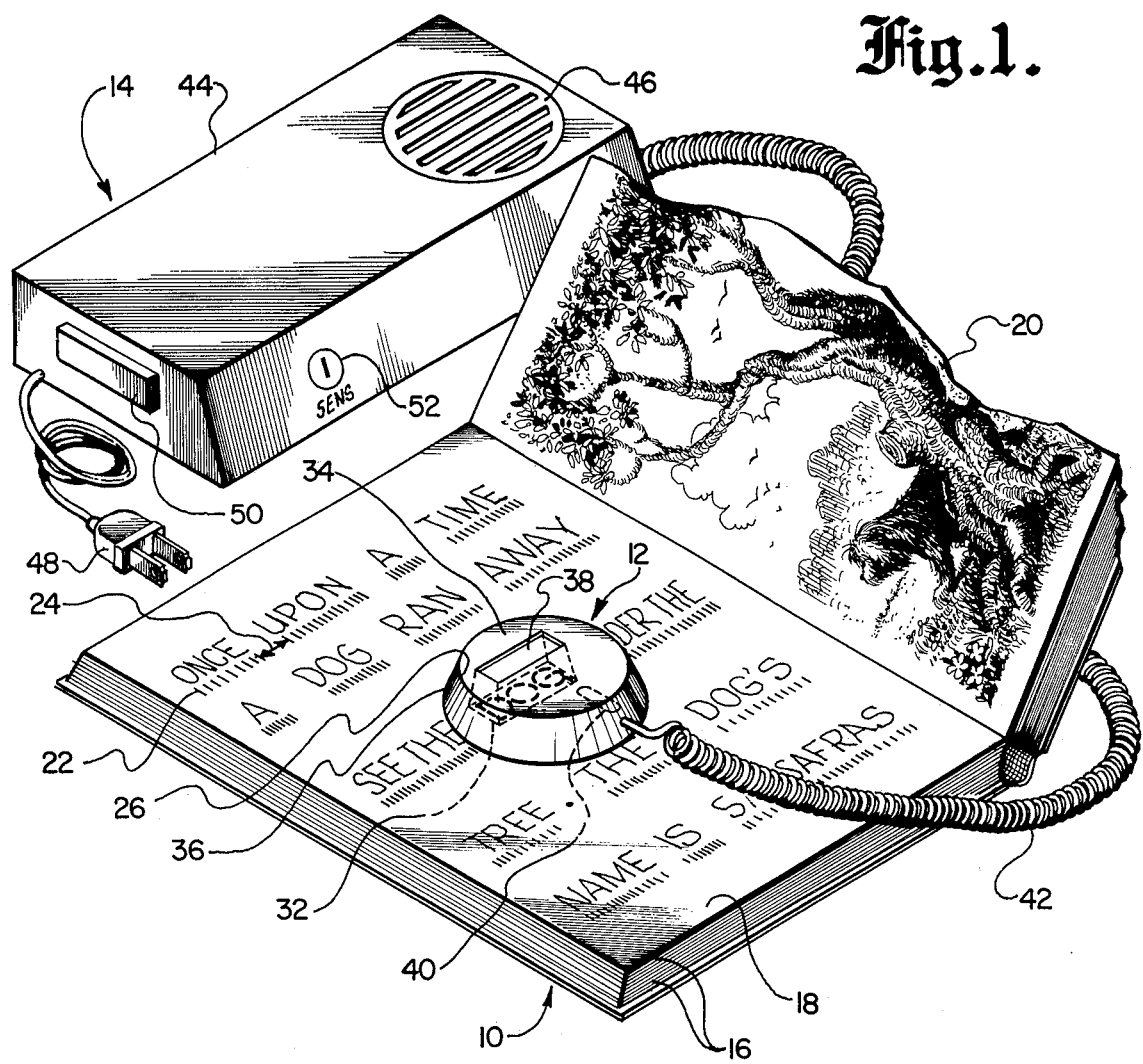
Fig.1.
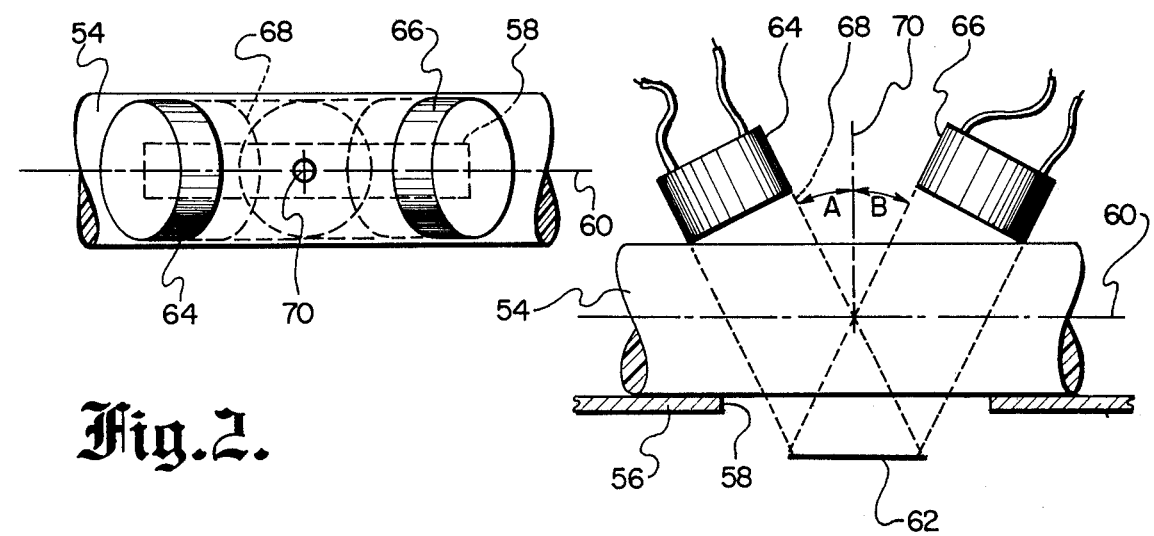
Fig.2.
Fig.3.

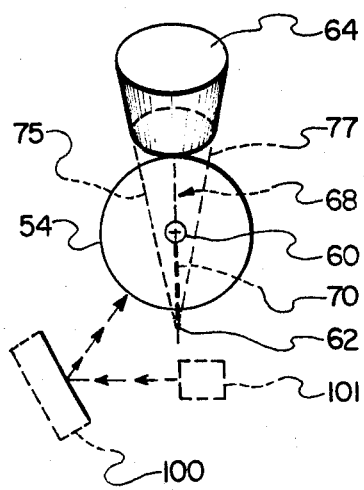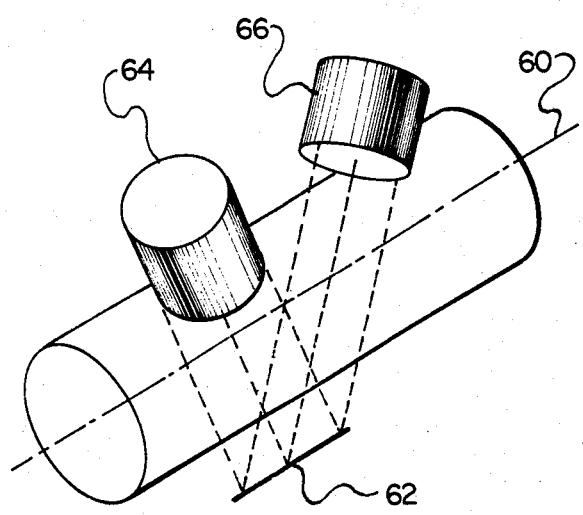
Fig. 4.
Fig. 5.
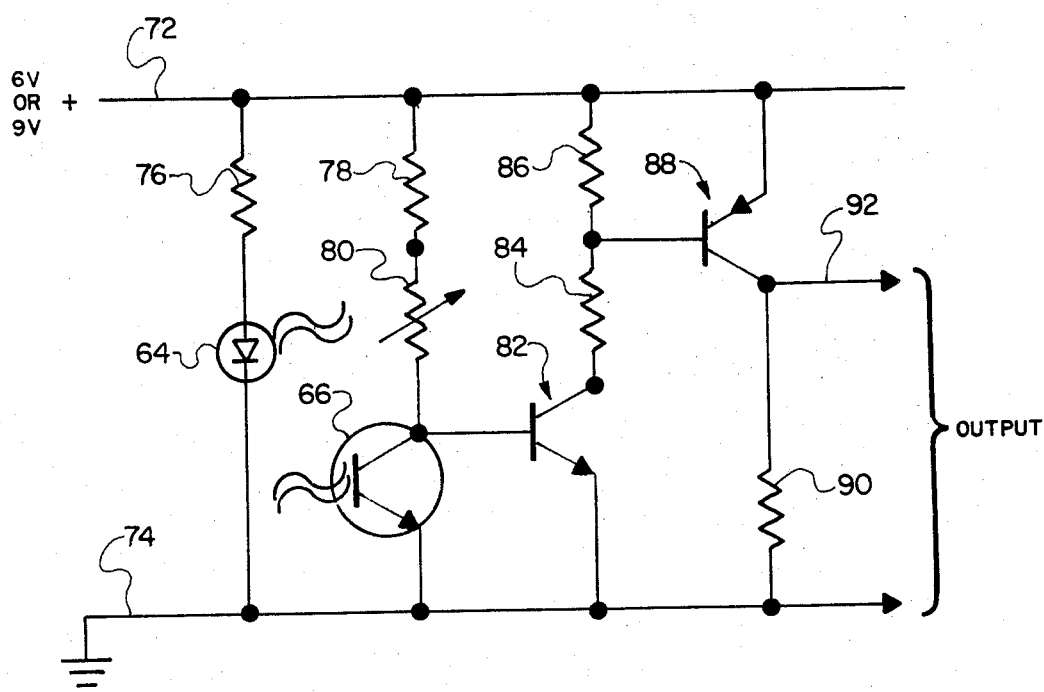
Fig. 6.

OPTICAL PROBE

DESCRIPTION

BACKGROUND OF THE INVENTION

The background of the invention will be set forth in three parts.

1. Field of the Invention

The present invention relates to optical recognition and, more particularly, to a hand-held probe for reading bar codes.

2. Prior Art

With regard to the art of optical code scanning, a number of devices are known which read printed bar codes optically and obtain digital information therefrom.

Berler, et al., in U.S. Pat. No. 3,731,064, disclose a binary code which is scanned by a hand-held reader comprising a lens, light source, and photoelectric sensor. The code comprises lines of a predetermined width and spaces which may be one of three different widths. Two widths signify 0 or 1; the third is an equalizing bit which makes each five-bit code the same length. Each five-bit code corresponds to one of the ten (10) digits in the standard arabic numbering system. The reader senses the time taken to scan the space between bars. The logic of the reader is constructed so that a line following a narrow space is registered as a "one" bit, and a wide space is registered as a "zero" bit. This is because a strobe signal examines whether or not the probe is over a line or a space at a predetermined time after a bar has been scanned. If a bar is sensed, a "one" is registered; if a space is sensed, a "zero" is registered.

Murthy, in U.S. Pat. No. 3,700,858, discloses an improvement over the foregoing code in that a pair of lines is substituted for the leading and trailing edge of each bar.

More sophisticated bar codes, such as the Universal Product Code and Codabar, are described in U.S. Pat. Nos. 4,058,708, 3,916,154, 3,886,521, 4,012,716, etc. These codes use timing logic to measure the width of each line and space. In the Universal Product Code, each decimal number is represented by two pairs of vertical bars and spaces within a seven-bit pattern. That is, a decimal four would be represented by 0100011, or a one width space, a one width bar, a three width space, and a two width bar. In scanning these codes, logic which measures the ratios of various components of the character code is used to obtain an accurate reading.

Optical probes for reading bar codes are also known in the art. Alpert, et al., in U.S. Pat. No. 3,761,685, disclose a configuration using a convex lens through which a photosensor gathers light reflected back from two angled lamps positioned in the nose portion of the probe. A frusto-conical baffle prevents light from the lamps from directly impinging on the photosensor.

A scanning pen having a fixed base is disclosed in U.S. Pat. No. 3,238,501. Light from a lamp is directed through a pair of convex lenses. A slit is placed approximately midway between the two lenses. A pair of photosensors is placed adjacent the slit.

A commercially available digital bar code wand is marketed by Hewlett-Packard. It utilizes an optical sensor with a 700 nm visible light source, a photo diode detector, and precision aspheric optics to obtain a resolution of 0.3 mm.

3. Objects of the Invention

It is, therefore, an object of the present invention to provide a low-cost hand-held probe for scanning an optical code.

Another object is to provide a hand-held probe with sufficient resolution to scan an optical code having relatively small spaces between indicia.

It is also an object of the present invention to provide a hand-held probe which emits and receives a large proportion of the light generated by its photoemitter.

SUMMARY OF THE INVENTION

The hand-held probe of the present invention comprises a length of transparent material in the shape of a cylindrical lens. The cylinder is arranged in a housing with its axis parallel to the page to be scanned. An optical emitter is mounted in the housing above the cylindrical lens in an orientation which is central with respect to the central axis of the lens, yet angled relative thereto. A detector is similarly mounted in the housing, at an angle selected in order to receive maximum radiant energy reflected back through the lens. The cylindrical lens tends to focus light from the emitter into a straight line. The width of this line may be further controlled by an elongated shutter positioned in the bottom side of the lens. An efficient optical emitter and collector system has been found which operates in the infrared range. The materials used for the probe are selected from inexpensive yet efficient plastic materials such as styrene or acrylic polymer for the lens and carbon-filled plastic for the housing.

BRIEF DESCRIPTION OF THE DRAWING

FIG. 1 is a perspective view of a voice synthesis reading probe according to the present invention;

FIG. 2 is a top view of a lens system of the probe of FIG. 1;

FIG. 3 is a side view of the lens system of FIG. 2;

FIG. 4 is an end view of the lens system of FIG. 3;

FIG. 5 is a perspective view of the lens system of FIG. 4; and

FIG. 6 is a schematic diagram of the probe.

DESCRIPTION OF THE PREFERRED EMBODIMENT

The description of the preferred embodiment will be set forth in two parts.

In General

Referring now to FIG. 1, there is shown, in general, an embodiment of a voice synthesis reading system preferred for use with the optical probe of the present invention. The system comprises a book 10, an optical probe 12 for reading the book, and a voice synthesis unit 14 connected to the probe for producing a voice output from optical characters scanned by the probe.

The book 10 comprises a plurality of pages 16 having a full page of text material 18 comprising human readable words in ordinary sentences. An illustration 20 may accompany the text material. Beneath each word of text material there is located a digital code word 22 in association with that word. Each digital code word comprises twelve bars and eleven spaces therebetween. Each digital code word is spaced from an adjacent digital code word by a space 24 which is sufficient to permit the scanning by the probe 12 of one code word without necessarily scanning another digital code word.

The probe 12 comprises a base portion 26 which permits the probe to be gripped by the user. It contains the optics for the probe, in a fixed position relative to the page.

The base portion 26 is approximately frustum-shaped, having a planar base surface 32 adapted for sliding across the page 16, a parallel upper surface 34, and an annular side surface 36. Extending from the upper surface 34 through the base portion 26 and base surface 32, is a generally rectangular aperture 38 slightly larger in size than the largest word in the text 18. The aperture provides an area for viewing the readable word as the digital word is scanned. Slightly to the right of the aperture 38 is a slot 40 through which the optically active elements of the probe 12 operate, as will be described more fully below. A cord 42 connects the probe 12 to the voice synthesis unit 14 and powers the probe. The cord 42 carries electrical signals proportional to the optical code scanned to the voice synthesis unit 14.

The voice synthesis unit 14 comprises the electronics which produce a voice output from the input signal in cord 42. It may be any type known in the art, but is preferably as shown in my copending Application Ser. No. 315280 filed Oct. 26, 1981. As shown in FIG. 1, the voice synthesis unit 14 comprises a plastic housing 44, defining a speaker opening 46 for a standard paper cone speaker, power cord connection 48, a plug-in word module 50, and a sensitivity control 52 for adjusting the sensitivity of the probe, also described below. The power supply may be either house current or battery power, as is known in the art.

The Probe

As shown in FIGS. 2 through 6, the probe 12 comprises a cylindrical lens mounted. Immediately above, and aligned with, the slot 40.

The base portion 26 is constructed of optically opaque material, such as carbon-filled plastic. The material is opaque in particular to the wave length selected for the optically active elements. In the case of infrared elements, carbon-filled plastic which is non-reflective is preferred.

The cylindrical lens 54 consists of a single piece cut from a length of optically clear plastic rod, preferably on the order of 0.19 in. (4.8 mm) in diameter. The lens material is a crystalline plastic, preferably styrene or acrylic polymer. The cylindrical lens is oriented in parallel relationship to the page 16. Immediately below the cylindrical lens, and contacting the lens tangentially, is a shutter 56 comprising a sheet of opaque non-reflective material defining a narrow elongated aperture 58, preferably on the order of 0.01 in (2.5 mm) by 0.2 in. (5.1 mm). The aperture 58 is narrower than the cylindrical lens and makes up for inefficiencies in the lens to reduce the area seen by the detector. As shown in FIG. 2, the aperture 58 is centered relative to the central axis 60 of the cylindrical lens. The cylindrical lens is positioned relative to the paper so that, in the case where a shutter is used, the paper is immediately adjacent to the shutter. If no shutter is used, the paper is spaced downwardly from the cylindrical lens at approximately the focal point 62 of the cylindrical lens. The shutter may be constructed from paper or other cellulosic material.

An optical emitter 64 and an optical detector 66 are mounted in the housing and directed towards the slot 40. They are above the lens 0.5 inch (1.2 cm). The emitter and detector are each provided with an immersion lens which, to some extent, collimates the light passing into or out of the device.

The emitter used is a Texas Instrument TIL32 infrared diode formed from gallium arsenide. Due to the immersion lens, the emitter may be said to have an output which is somewhat cylindrical as indicated at 68. The emitter 64 is positioned relative to the cylindrical lens 54 so that the emitter output 68 is centered relative to the lens according the top view shown in FIG. 2 and the end view as shown in FIG. 4, i.e. centered with respect to the central axis 60. The emitter output 68 is angled, however, with respect to the side view FIG. 3 and a line 70 which may be denominated a vertical axis is constructed in perpendicular intersection with the central axis 60 and passing through the center of the slot 40. The angle between the emitter output 68 and the vertical axis 70 is shown in FIG. 3 as angle A. This angle is selected to minimize reflectance from the lens surface. The emitter wavelength at peak emission ranges from 915 to 975 nm, typically around 940 nm. As A is increased, the length of the illuminated rectangle increases.

The operation of the cylindrical lens with respect to focusing the emitter output 68 is shown best in FIG. 4. Light striking the lens 54 at an approximate normal angle to the tangent of the surface of the lens 54 passes directly through the lens. Light as shown at 75, 77 which strikes the cylindrical lens at an angle is refracted by the lens toward the vertical axis 70, thereby focusing the light passing from the lens at 62. This effect is the same regardless of where along the central axis 60 of the lens the light is striking the lens.

The detector 66 is mounted in the housing in an orientation complimentary to that of the emitter 64. With regard to the top view, FIG. 2, and the end view FIG. 4, the detector 66 is centrally located relative to the central axis 60. The detector 66 is angled relative to the vertical axis 70 at an angle B which may be 0° or more and is matched to angle A at the optimum receiving angle. At an angle of zero, the detector is centered over the illuminated rectangle 62. The detector is a Texas Instrument TIL78 silicon photo-transistor. It operates in the wavelength range of the emitter. For this reason, that range within the infrared is preferred for the operating range of the present device.

Referring now to FIG. 6, the power circuitry for the probe is shown. The emitter 64 is connected between a power line 72 and a ground line 74 through a current limiting resistor 76. The detector 66 is also connected between line 72 and line 74 through a resistor 78 and a variable resistor 80. These two resistors are each on the order of 100K in value. They are connected to the collector of the detector 66, the emitter of the detector being connected to line 74. Photons falling upon the base of the detector 66 cause it to become conductive. Variable resistor 80 forms the sensitivity control 52 shown in FIG. 1. The collector of the detector 66 is tied to the base of a switching transistor 82. The emitter of transistor 82 is tied to the ground line 74, and the collector of this transistor is connected through resistors 84, 86, to the power line 72. A second switching transistor 88 is connected with its base between resistors 84, 86. Transistor 88 is of the PNP type, with its emitter tied to power line 72 and its collector tied through resistor 90 to ground line 74 and to line 92, lines 92 and 74 representing an output from the device. Transistor 88 provides a fast rise time square wave pattern.

Resistors 78, 80 between the power line and the ground line are selected to provide enough base drive current to transistor 82 to saturate it when no radiant power (light) falls on the detector 66. When radiant power impinges on the detector, it is turned on, i.e. it becomes forward biased, to conduct current, because enough base current is generated in the device to saturate it. At that point it will bypass all current through resistors 78, 80 to ground. At this point, no current goes through the emitter-base junction of transistor 82. In that case, no current flows through transistor 88 and it is an open switch. When transistor 88 is open, resistor 90 pulls the output low, i.e. approaching the ground potential.

With the preferred bar code, a bar reflects no radiation. In this condition, current flows through transistor 82, since its base current is provided through resistors 78, 80. Resistors 78, 80 are adjusted to provide enough base current to transistor 82. When transistor 82 is saturated, it lets collector current flow through resistor 84 and through the emitter-base junction of transistor 88. Now, transistor 88 is saturated and pulls the output on line 92 close to the voltage level of line 72, resulting in a logic high state.

An alternative embodiment contemplated by the present invention comprises a reflective surface 100 as shown in FIG. 4 extending parallel to central axis 60 and angled relative to the vertical axis 70 at an approximate 45° angle, the surface extending from approximately the vertical axis across one side of the cylinder at a slight distance from the cylinder. The emitter and detector are directed towards the surface 100 as shown at 101 so that the beam of light to or from the emitter or detector strikes the mirrored surface at an approximate 45° angle. The emitter and detector are centered relative to their beam cross sections as previously described. This arrangement permits the use of a more compact housing.

What is claimed is:

1. A hand-held probe for scanning an optical code comprising:
   a length of optically clear material comprised in the shape of a cylindrical lens having a central axis;
   an optically opaque housing supporting said clear material in axially parallel relationship to the code to be scanned and defining an opening in a first plane which, in use, is adjacent to the code to be scanned;
   an optical emitter mounted in said housing and emitting a beam of radiant energy through said clear material to said opening, said beam being approximately centered relative to said central axis; and
   an electro-optical detector, for producing an electronic signal proportional to variations in radiant energy received, mounted in said housing and receiving radiant energy through said lens in a sectional area centered relative to said central axis and directed towards said emitter,
   whereby radiant energy from said emitter is focused by said lens into a line parallel to said central axis and reflected back through said lens material to said detector.

2. The probe of claim 1 wherein said opening is narrower in width than the lens.

3. The probe of claim 1 wherein said optical emitter emits light in the range of nine hundred and fifteen to nine hundred and seventy-five nm.

4. The probe claim 3 wherein said detector is silicon-based.

5. The probe of claim 1 wherein said lens is a styrene or acrylic polymer.

6. The probe of claim 1 wherein said emitter is angled at an acute angle relative to said lens.

7. The probe of claim 1 further comprising:
   a reflective surface mounted in said housing in parallel to said central axis, angled relative to said first plane, and spaced from said lens so that radiant energy from said emitter is reflected by said reflective surface through said lens.

8. A hand-held probe for scanning an optical code comprising:
   a length of optically clear material comprised in the shape of a cylindrical lens having a central axis;
   an optically opaque housing supporting said clear material in axially parallel relationship to a planar base surface for sliding on a surface to be scanned and defining an opening in a first plane which, in use, is adjacent to the code to be scanned, and further including an aperture therethrough for viewing printed matter adjacent said optical code, and a finger gripping outer surface;
   an optical emitter mounted in said housing and emitting a beam of radiant energy through said clear material to said opening, said beam being approximately centered relative to said central axis; and
   an electro-optical detector, for producing an electronic signal proportional to variations in radiant energy received, mounted in said housing and receiving radiant energy through said lens in a sectional area centered relative to said central axis and directed towards said emitter,
   whereby radiant energy from said emitter is focused by said lens into a line parallel to said central axis and reflected back through said lens material to said detector.

9. The probe of claim 8 wherein said aperture is positioned in said housing so that the printed matter view is centered in the aperture when said opening is adjacent a last bar in a code word.

* * * * *